Jan. 23, 1951  W. P. LEAR  2,539,089
DUAL RANGE AUTOMATIC TEMPERATURE CONTROL SYSTEM
Filed Feb. 14, 1945  3 Sheets-Sheet 1
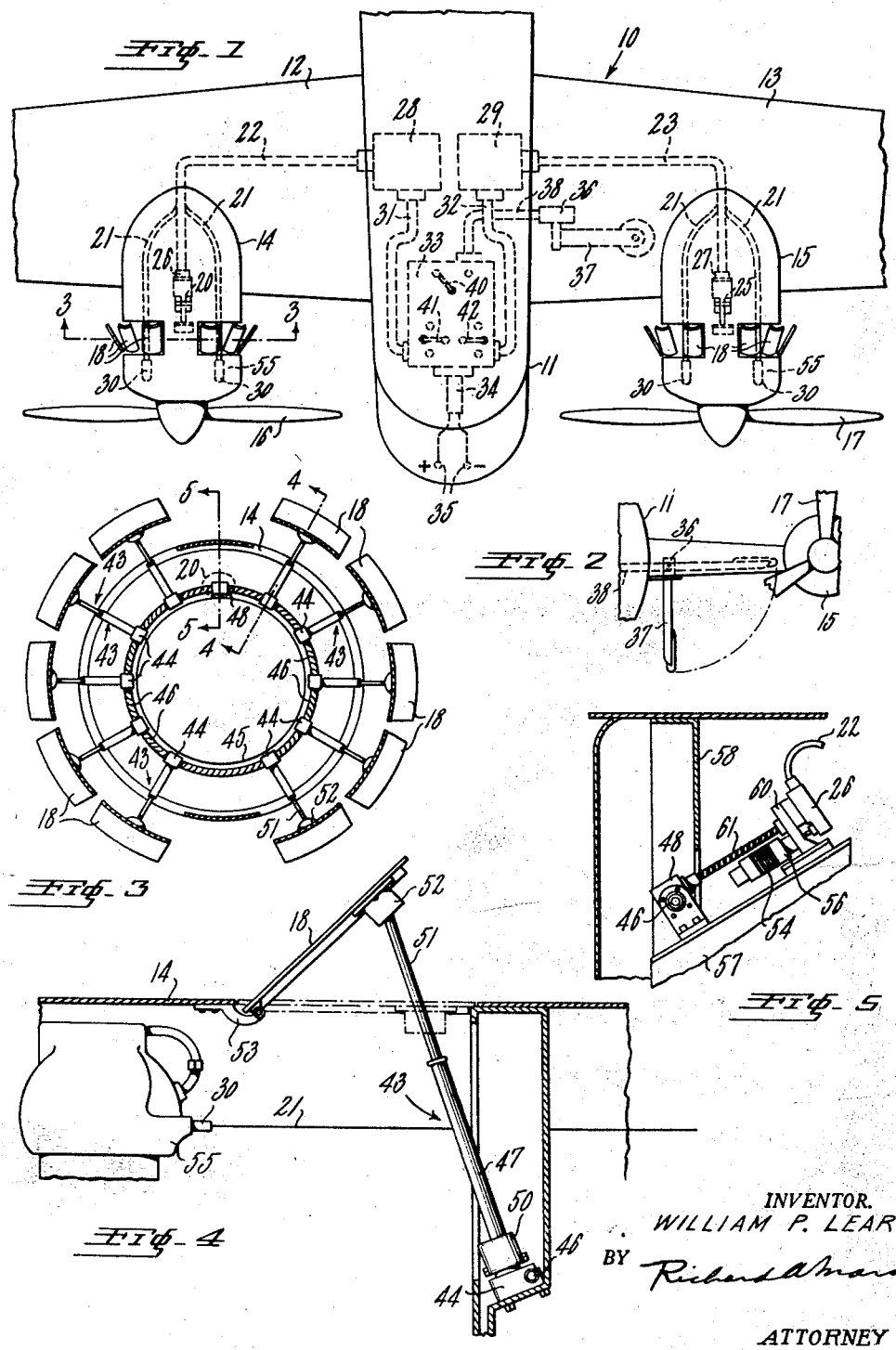
INVENTOR.
WILLIAM P. LEAR
BY
ATTORNEY Jan. 23, 1951 W. P. LEAR 2,539,089
DUAL RANGE AUTOMATIC TEMPERATURE CONTROL SYSTEM
Filed Feb. 14, 1945 3 Sheets-Sheet 2
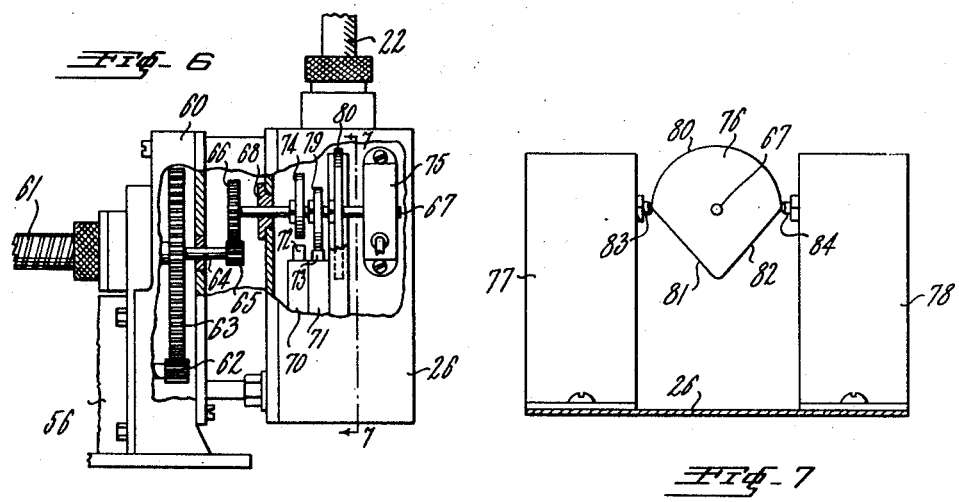
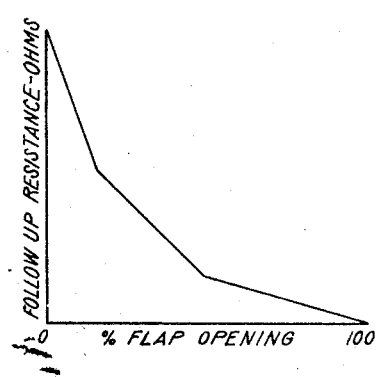
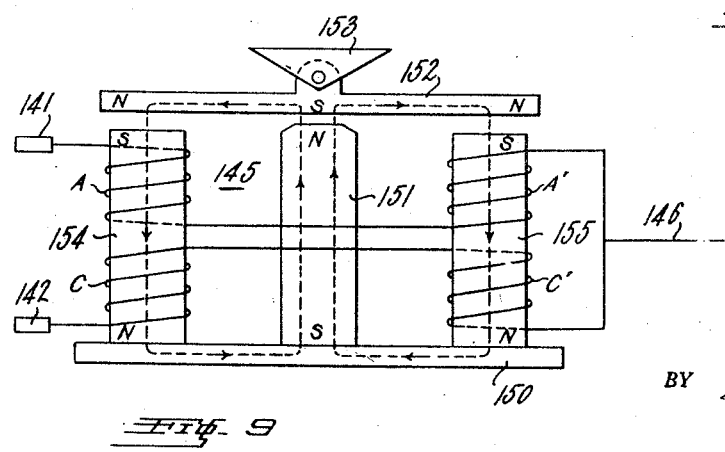
INVENTOR.
WILLIAM P. LEAR
BY
ATTORNEY

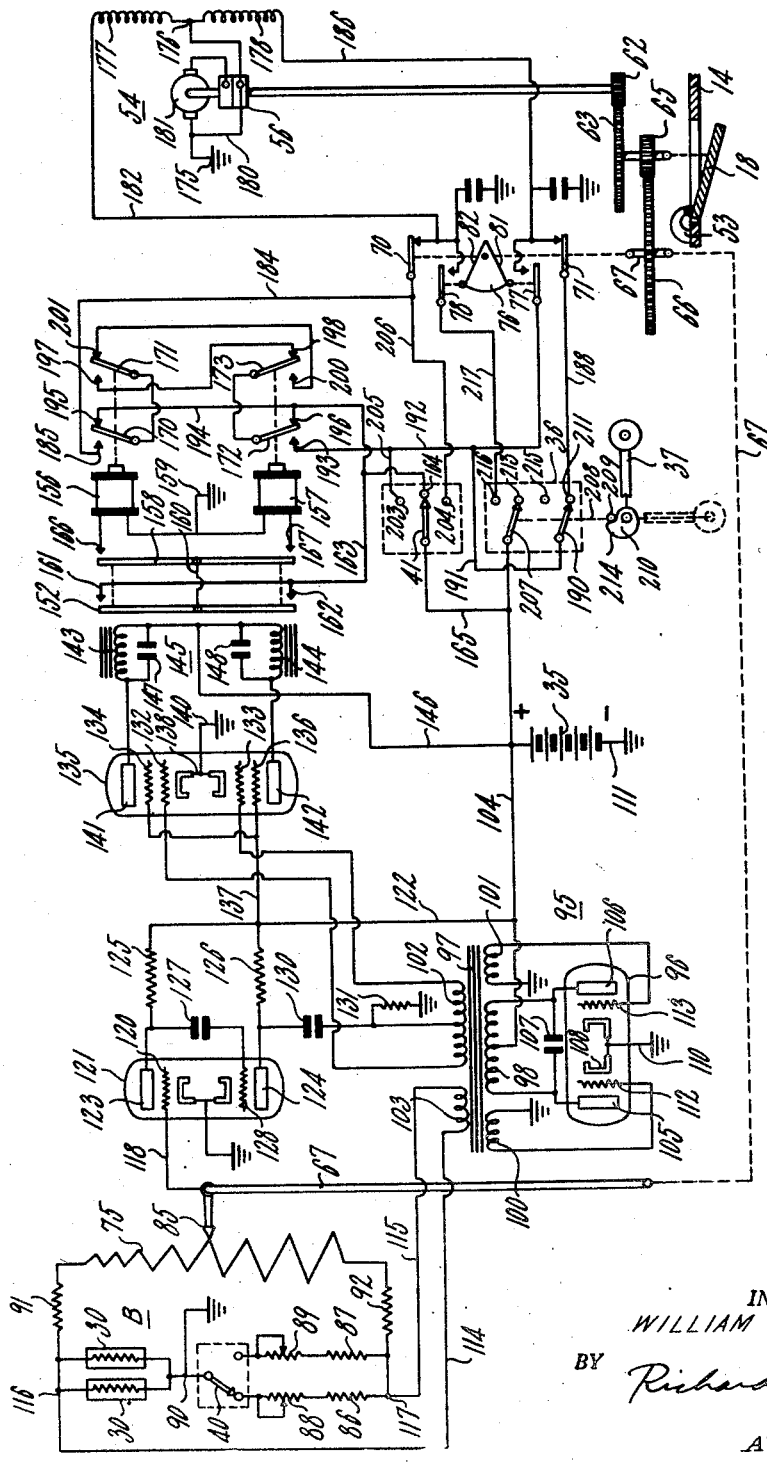

Patented Jan. 23, 1951

2,539,089

UNITED STATES PATENT OFFICE 2,539,089

DUAL RANGE AUTOMATIC TEMPERATURE CONTROL SYSTEM

William P. Lear, North Hollywood, Calif., assignor, by mesne assignments, to Lear, Incorporated, Grand Rapids, Mich., a corporation of Illinois Application February 14, 1945, Serial No. 577,911

1 Claim. (Cl. 236—78)

This invention relates to automatic temperature control systems, and more particularly to a novel self-contained, sensitive modulating temperature control arrangement particularly effective for closely maintaining the temperature of components aboard an aircraft such as of engines, or otherwise. The present application is a continuation-in-part of my copending application Serial No. 535,658 filed May 15, 1944 for "Automatic Temperature Control System," now abandoned.

The problem of controlling the temperature of aircraft engines has become increasingly important with the progressively enlarged size and speed of aircraft and the improved efficiency thereof. War aircraft particularly require close engine efficiency control to conserve fuel in flight, effected by engine temperature control. Aboard a multi-engine airplane, maintaining the proper operating temperature and performance of the several engines usually requires much attention of a flight engineer. In single seater planes, the pilot is confronted with so many duties to be performed at substantially the same time, that it is impractical for him to give sufficient attention to maintaining the engine temperature at a desirable optimum value. Semi-automatic temperature controls are open to the same objections as are manual controls as they still require considerable attention from a very busy pilot or flight engineer. Accordingly, it is desirable to have the engine temperature maintained automatically at its optimum value for given operating conditions.

A properly designed temperature control system should protect the engine against destructive operating temperatures under any conditions within the cooling limitations of the installation. Furthermore, in the case of air-cooled aircraft engines, the cooling drag horsepower should be reduced to the lowest value consistent with desired engine operating temperatures. This cooling drag is introduced by the general use of movable flaps for varying the amount of cooling fluid passing in contact with the engine. Such flaps when opened for cooling, increase the aerodynamic resistance of the airplane, and so should not be kept opened more than necessary.

The present invention solves these problems and provides an effective modulating automatic temperature control for varying the supply of coolant to the engine in accordance with the optimum operating temperature thereof. To accomplish this, one or more temperature sensitive resistance elements in operative association with the engine are balanced against a control resistance whose value is dependent upon the desired operating range of engine temperature. Upon an unbalance between these two elements, control apparatus is automatically put into operation to effect a change in the rate of cooling of the engine to restore balance between the elements. The control is effected electronically, with provision made for insuring accurate positioning of the cooling fluid control elements, such as the cowl flaps, in accordance with the desired rate of flow of cooling fluid.

The present invention is particularly adapted for use aboard aircraft in that it includes a self-contained source of alternating voltage for reference purposes, and thereby does not require the use of a separate alternating current generator on the aircraft. In other words, the only energy source required by the present system is the usual 28 volt battery or generator of the aircraft. This, as will be understood by those skilled in the art, materially reduces the weight of the components necessary to be carried aboard the aircraft.

The present invention is further particularly applicable for aircraft designs wherein full outward or opening movement of cooling flaps is prevented under certain conditions. While an airplane in flight is able to insure the passage of sufficient air over the engine for proper cooling under all conditions of operation in flight and a temperature controlling system for flight conditions may be provided, the condition existing when the airplane is at rest or during takeoff may be radically different. That is to say, when the airplane is on the ground and the engine is warming up the cowl flaps are desirably held all the way closed. This necessitates a more limited range of temperature control than when the airplane is aloft. Stated otherwise, the response of the apparatus or system used to control the opening and closing of the cowl flaps in accordance with the engine temperature might be entirely different during idling than when the engine is rotating at normal cruising speed. Such comparison obtains also between an airplane taking off and one which is in full flight. In order to obtain a reliable reference whereby the operating range of the temperature control system may be transferred from a particular range to a narrower range, which reference is determined by the in flight or grounded condition of the airplane respectively, the landing gear position may provide a satisfactory standard. In modern aircraft, the landing gear is almost universally retractable. Accordingly, when the airplane is on the ground and the gear extended, such condition may be used in conjunction with a temperature control system to change the range of operation in the manner previously indicated. Vice versa, when the airplane is in flight, the landing gear is retracted and the operating range restored to what may be termed normal flight condition. Moreover, since the landing gear is not fully retracted until a period of time after the takeoff, maintenance of the narrower range of temperature control during takeoff may be effectively achieved. With the present invention, the range of movement of the flaps may be automatically limited when the landing gear is extended, and the flaps are retracted within such limited range in the event that they should be in a position beyond the limited range when the landing gear is extended.

While the system of the invention is particularly applicable to controlling the temperature of air or liquid cooled aircraft engines within narrow desired operating ranges, it is equally adaptable for other heating or cooling control applications. Thus, the principles of the invention may be applied to controlling coolant oil temperature, cabin temperature, and so forth, aboard an aircraft. Furthermore, the invention system is applicable to refrigeration systems wherein a refrigerating fluid is to be maintained at a preselected low temperature. In all these instances, the present invention affords a very sensitive, practical, rugged, yet flexible modulating temperature control for keeping temperatures within desired close limits. The invention system maintains the desired temperatures at a stable equilibrium, in a simple, practical and effective manner, and is useful for many applications aboard modern aircraft, as well as for industrial, home or other uses.

It is therefore, among the objects of this invention to provide a novel, sensitive, automatic, modulating temperature control system; to provide such a control system that is effective to vary the rate of cooling of an engine or medium in accordance with desired or readily preselectable optimum operating temperatures thereof; to provide such a system which is effective over a plurality of different operating temperature ranges of the body whose temperature is to be controlled; to provide such a system including a novel self-contained source of alternating reference voltage fully operable from a battery source; to provide such a system including means automatically operable in response to the occurrence of a given condition for altering the range of operation of the cooling control elements; to provide such a system that is sensitive to small incremental temperature changes to effect cooling in accordance with the optimum operating temperature of the engine or medium; to provide such a system including self-contained control apparatus which is compact, simple and efficient; and to provide a rugged flexible, yet very sensitive dual stroke self-contained automatic temperature control system.

These and other objects, advantages and novel features of the invention will be apparent from the following description and the accompanying drawings. In the drawings:

Fig. 1 is a plan view of the central forward portion of an airplane, schematically illustrating one embodiment of the automatic temperature control system of the present invention.

Fig. 2 is a front elevation view of a portion of the airplane shown in Fig. 1.

Fig. 3 is a vertical sectional view taken on the line 3—3 of Fig. 1, looking in the direction of the arrows.

Fig. 4 is a sectional view taken on the line 4—4 of Fig. 3 looking in the direction of the arrows.

Fig. 5 is a sectional view taken on the line 5—5 of Fig. 3 looking in the direction of the arrows.

Fig. 6 is an elevation view, partly in section, illustrating control elements forming part of the present invention.

Fig. 7 is an elevation view taken on the line 7—7 of Fig. 6.

Fig. 8 is a schematic wiring diagram illustrating an embodiment of the automatic temperature control system of the invention.

Fig. 9 is a schematic view of a novel differential relay used in the invention control system.

Fig. 10 is a graph illustrating the relation between the percent of engine cooling flap opening and the ohmic value of a connected follow-up circuit resistance.

Fig. 11 is a longitudinal sectional view through an electromagnetic clutch and brake unit incorporated in the present invention.

Generally speaking, in accordance with the principles of the present invention, a thermosensitive resistance element is operatively associated with the heatable body or medium and is connected electrically in a balanced bridge circuit including a variable "follow-up" resistance. Upon a variation in the temperature of the body or engine, the resulting bridge circuit becomes unbalanced due to a corresponding change in the resistance of the sensitive element. The electrical or control signal resulting from unbalance of the bridge is impressed upon a thermionic amplifier to effect selective operation of a relay system which, in turn, effects energization of a cooling control motor drive. The motor is connected through gearing to suitable actuators to controllably effect cooling or heating as the case may be. The motor, through the actuators, varies the degree of opening or other movement of the cooling or heating control elements, to vary the desired operating temperature of the engine or body.

The follow-up variable resistance or potentiometer is coupled to the movable control elements, whereby its resistance value is varied in correspondence with their changed positions. Such resistance change is reflected in a reorientation in the sense to effect a new bridge circuit balance. When the bridge is rebalanced, the control signal is extinguished and the motor is abruptly stopped, leaving the control elements in their last or stabilized position. The bridge becomes rebalanced at the new value of resistance of the thermo-sensitive element, which rebalance is within a designed temperature range for the temperature controlled body.

For providing reference alternating voltage for the bridge and for the control circuit elements, an electronic oscillator unit is incorporated in the system. The reference alternating voltage source thus incorporated within the system, eliminates the necessity for carrying a separate alternating current generator on the aircraft, thereby decreasing the weight of required components aboard the aircraft. The oscillator is fed from the usual D. C. supply customarily aboard aircraft, such as a 28 volt storage battery or generator.

The system is also particularly adapted for use in aircraft wherein it is desired to change the operating range of the temperature control system in accordance with the position of the landing gear and as heretofore more fully pointed out. For this purpose, the circuit includes switching means automatically rendered effective, by movement of the landing gear or other positionable element to a predetermined position, for limiting the opening movement of the cooling control element, such as cowl flaps, and for effecting movement of the cooling control elements back within such limited range in the event that such elements are outside the limited range when the landing gear or other device is moved to such predetermined position. Furthermore, the control system also includes temperature range selecting means whereby the system is effective to control the cooling of the aircraft engine or other medium within any one of several desired temperature ranges.

In order that the control elements be accurately positioned to, in turn, closely control the rate of coolant or heat flow to the engine or body, the system motor is connected to the actuator system through an abruptly acting electromagnetic clutch and brake unit which may be of the type described and claimed in my Patent No. 2,267,114 issued December 23, 1941, and assigned to the same assignee as the present invention. Such clutch and brake unit permits stable sensitive positioning of the connected cooling control elements when the control signal from the bridge circuit reaches a null or balance point.

As the amount of air flowing past an air-cooled engine is not varied in equal amounts with each mechanical degree of cowl flap movement in the different angular positions of the flaps about such engine, a tapered follow-up rheostat is preferably provided. For instance, when the flaps are moved from closed position to slightly open position, the increase in the amount of air flowing around the engine is very great. However, further movement of the flaps from any small open position through the same degree of movement will not increase the flow of air again by the same amount, but by a lesser amount. Accordingly, the tapered rheostat is provided so that variation in the proportioning of the rheostat will compensate for such variation in air flow past the engine.

Furthermore, for easy maintenance and easy installation of the system aboard an aircraft, the several components of the control system are grouped into a plurality of control units, interconnected by suitable circuit means such as multi-conductor electric cables. For instance, the system includes an electromechanical control unit associated with the cooling control motor and including limit switch means for the system, switching means predetermining the effective range of operation of the system, and a "follow-up" potentiometer associated with the cooling element operating system. The system further includes an electronic control unit containing the electronic elements of the control circuit including elements of the bridge circuit, the electronic oscillator unit for providing the alternating reference voltage, electronic amplifying means, a novel polarized differential relay and associated secondary relays controlling the operation of the power operating device for the cooling control elements. Remaining elements of the system, such as the temperature range selecting switch and manual override switches are mounted on a control panel which is preferably disposed adjacent the pilot or flight engineer's position. All of these elements, including the temperature sensitive elements which are associated with the aircraft engines, are interconnected by suitable electrical means such as multi-conductor electric cables and may thus be individually located at any suitable or available locations aboard the aircraft.

Referring to Figs. 1 through 5, the invention is illustrated as applied to a multi-engined airplane 10 having a fuselage 11, wings 12, 13, and engine nacelles 14, 15 containing aircooled engines 55, 55 driving propellers 16, 17. The flow of air over the engines is controlled by movable cowl flaps 18 pivotally mounted on the engine cowlings or nacelles 14, 15. The position of flaps 18 is shown controlled by a cowl flap operating system of the type described and claimed in my Patent No. 2,319,463 for "Mechanical Actuator System," issued May 18, 1943 and assigned to the assignee of the present invention. For the sake of simplicity, Fig. 1 merely illustrates the power drive units 20 and 25 for the cowl flap actuating system schematically, the actuating system being more fully shown in Figs. 2 through 5.

In accordance with the present invention, the degree of opening of flaps 18 is controlled in accordance with the amount of cooling air necessary to provide the optimum or desired operating equilibrium temperature for the engines at a given condition of operation. For this purpose, one or more temperature resistance elements 30 are operatively associated with each engine in a manner to be described more fully hereinafter. Cables 21 electrically connect elements 30 into either of a pair of main cables 22 and 23, which also electrically connect electromechanical control units 26 and 27, each associated with one of the power drive units 20, 25, to electronic control units 28 and 29. Cables 31 and 32 electrically connect control units 28, 29 to a control panel 33 located adjacent the pilot's or flight engineer's position. Control panel 33 is connected by a cable 34 to a source of direct current 35 which may be the usual 24-28 volt airplane battery or generator. The alternating reference voltage for the system is provided by electronic oscilator units incorporated in electronic control units 28, 29, as described more fully hereinafter. A switching device 36 associated with retractable landing gear 37 is connected by a cable 38 to control panel 33, and thus to control units 26, 27 in a manner to be described more fully.

Desirably, the temperature sensitive element or elements 30 operatively associated with the heatable body, are such as to have a uniform temperature coefficient of resistivity, so that the impedance value of such elements varies uniformly as a function of the heatable body temperature. A satisfactory temperature sensitive element is a compound including some of the rare earths and having a high negative temperature coefficient of resistance. However, temperature sensitive elements having a positive temperature coefficient of resistivity may likewise be used, provided that the temperature coefficient remains substantially uniform over a fairly wide range. I have successfully used an element termed "Thermistors" which is described on page 22 of a pamphlet entitled "Varistors," published by the Bell Telephone Laboratories in March 1941.

According to the present invention, means are provided for the pilot to select the desired operating temperature for the engines 55. Such means are preferably mounted on control panel 33, and may comprise a temperature range selecting switch 40 which controls the desired operating range for each of the aircraft engines in a manner to be described in more detail. For the purpose of illustration, switch 40 has been illustrated as a two position switch, thus providing two temperature ranges. However, a greater number of temperature ranges may be provided, if desired. Panel 33 also contains manual override switches 41 and 42 for each of the engine cooling systems. The manual override is provided for directly controlling the opening or closing of flaps 18 irrespective of the automatic control during warming up operations on the ground, during "throttle bursts," emergencies or when otherwise desired.

Briefly speaking, the system operates in the following manner. Assuming that control switches 41 and 42 are each in the position shown, for automatic temperature control of the position of flaps 18, temperature selecting switch 40 is moved to the position corresponding to the desired operating temperature range for the engines. If the engine temperature changes from this predetermined value, the resistance of the temperature sensitive elements 30 changes as a function of the temperature change and this, in a manner to be described more fully hereinafter, effects unbalance of an electrical bridge circuit to apply a signal to control apparatus contained in electronic control units 28, 29. The control apparatus in units 28, 29 thereupon energizes power drive units 20 and 25 to effect operation of flaps 18 in one direction or the other until a balance is effected between the engine temperature and the amount of cooling air flowing over the engine. Such modulating temperature control continues to maintain temperature equilibrium throughout the particular temperature range selected.

Fig. 3 illustrates the mechanical interconnection for controlling the opening and closing of cowl flaps 18 associated with engine nacelle 14. The mechanical interconnection for engine nacelle 15 is identical with that of engine nacelle 14. An individual screw jack 43 extends between each cowl flap 18 and an associated stationary mounted gear box 44. Gear boxes 44 are supported on a mounting ring 45 within nacelle 14. Flexible shafts 46 interconnect gear boxes 44 forming a continuous mechanical arrangement. A drive gear box 48 is provided for motivating jacks 43 and associated cowl flaps 18 in unison. The motor drive in the interlinked mechanical system is indicated in Fig. 3 at 20 and is shown in more detail in Figs. 5 through 8.

Rotation of motor drive 20 in either direction correspondingly rotates interlinked mechanical shafts 46 and the associated gearing within boxes 44. Fig. 4 is an enlarged cross-sectional showing of the action of a single screw jack 43 on its cowl flap 18. In this figure, cowl flap 18 is shown in its extended position. Screw jack 43 essentially comprises a screw or threaded member enclosed in a sleeve 47 and flexibly coupled to gear box 44 through a coupling member 50 of the type described in detail in my said Patent No. 2,319,463. A coacting sleeve or tubular member 51 flexibly couples the jack through flap 18 to a coupling member 52. Sleeve 51 is internally threaded or contains a threaded nut cooperating with screw and sleeve 47 so that relative rotation of the screw and the sleeve will effect extension or retraction of jack 43. Hinge 53 pivotally supports nacelle flap 18 on cowl 14.

Engine 55 is shown arranged inside nacelle 14 in such a manner that the rate of outside cooling air flowing thereover is controlled by the degree of opening of flaps 18. Temperature sensitive elements 30 are suitably imbedded in recesses or wells provided in engine 55. Cables 21 extend rearwardly from such temperature sensitive elements 30 to their connection on main cables 22 and 23.

Figs. 5 and 6 show the motive drive arrangement for the system. Driving unit 20 includes a reversible electric motor 54 which contains assembled therewith an electromagnetic clutch and brake unit 56 having a clutch engageable upon energization of the motor through cable 22, which connects with electronic control units 28 and 29. Motor unit 20 is supported on a bracket 57 which extends from the internal cowl frame 58. A remote electromotive drive including a fast stopping clutch, such as disclosed in my said Patent No. 2,267,114 is preferred to insure close stable control of movement of cowl flaps 18. Clutch 56 is operated to connect the motor to gearing in a gear box 60 which gearing is coupled to gearing in gear box 48 through flexible shafting 61. The gearing in box 60 also operates final limit switches, range determining switches and a "follow-up" potentiometer in electromechanical control unit 26 mounted on the motor unit. Upon rotation of motor 54 in either direction, the clutch and brake unit 56 is energized to connect the motor to the gearing in box 60 to drive gearing in box 48 through flexible shafting 61. This in turn drives the gearing contained in boxes 44 through flexible shafting 46 to operate jacks 43.

Drive unit 20 and associated gear box 60 and control unit 26 are illustrated more fully in Fig. 6. As shown therein, the output pinion 62 of clutch and brake unit 56 drives a main gear 63 secured to shaft 64 supported in bearings in gear box 60. Also secured to shaft 64 is a pinion 65 engaging a spur gear 66 mounted on a shaft 67 extending through a bearing 68 into control box 26. Control unit 26 contains a pair of normally closed snap limit switches 70 and 71 which limit the final movement of motor 54 in either direction. Switches 70 and 71 are provided with operating plungers 72 and 73 engageable by cams 74 and 79, respectively, each adjustably mounted on shaft 67. Shaft 67 also extends into a tapered potentiometer 75, wherein it is secured to the adjustable contact of the potentiometer. The potentiometer is connected in a balanced bridge circuit with temperature sensitive elements 30 and fixed temperature range selecting resistances controlled by switch 40, as will be described in connection with the description of Fig. 8.

Also mounted on shaft 67 is a cam 76 controlling a pair of normally open snap switches 77 and 78. Cam 76 is provided with a curved surface 80 concentric with shaft 67 and with discontinuous surface portions 81 and 82. Rotation of cam 76 in either direction from the position shown in Fig. 7 will permit outward movement of the plungers 83 or 84 of switches 77 and 78 to close these switches. Cam 76 and associated switches 77 and 78 are similar to portions of the switching arrangement shown in my copending application Serial No. 514,956 filed December 20, 1943 for "Preselection Control Device" and assigned to the assignee of the present invention, and which matured into Pat. No. 2,427,792. The operation of cam 76 in controlling switches 77 and 78 will be described more fully hereinafter in connection with the description of Fig. 8.

Fig. 8 schematically illustrates the electronic and electromechanical elements of the invention system. The control elements include tapered potentiometer 75, having an adjustable contact 85 operated by shaft 67. The portions of potentiometer 75 at either side of contact 85 provide two arms of a balanced bridge circuit B. The third arm is provided by temperature sensitive elements 30; and the fourth arm by two temperature range selecting, fixed resistances 86 and 87 each in series with an adjustable potentiometer 88 and 89. Resistances 86 through 89 are selectively connectible in the bridge circuit by operation of the temperature range selecting switch 40. The junction 90 of temperature sensitive elements 30 and switch 40 is connected to ground. Resistors 91 and 92 are connected in series between the ends of potentiometer 75, and elements 30 and the group of resistances 86, 87, 88, 89, respectively. The fixed resistors 91 and 92 in series with each section of potentiometer 75 are such as to effect a substantially 1:1:1:1 ratio of the four arms of electrical bridge B. Thus, one arm of the bridge comprises resistor 91 and the upper section of potentiometer 75; a second arm, resistor 92 and the lower section of potentiometer 75; a third arm, temperature resistance elements 30 in parallel; and the fourth arm a selected group of the series connected resistances 86 and 88, or 87 and 89.

Potentiometer 75 desirably has a relatively low total resistance so that its total resistance corresponds only to the change in resistance of elements 30 corresponding to a desired overall or modulating temperature range which the system is set to maintain in the engine or body. The design and total stroke of the flaps, in the case of the aircooled engine being described, is such as to insure such modulating range by the control system. A preferred modulating range is, in the illustrated system, approximately 25° F. For liquid cooled engines a desirable range is 11° F. The resistance of potentiometer 75 is made to correspond to the change in flap position from fully opened to fully closed or vice versa, and its resistance range to correspond with the effective resistance change in paralleled elements 30 for the temperature range. The temperature is balanced at any point on potentiometer 75 when the amount of coolant permitted to flow over the engine due to the particular degree of flap opening is sufficient to stabilize the engine temperature within the modulating range. The temperature may be balanced at any value within the 25° range, and correspond to any point along potentiometer 75 at which the bridge is rebalanced into this condition. Fixed or reference resistances groups 86, 88 and 87, 89 have an ohmic value of the same order of magnitude as elements 30 attain at the respective desired operating temperature ranges. The result of using large resistors 91 and 92 is that a relatively small potentiometer 75 may be used, as the portions of the potentiometer merely correspond in ohmic value with the change in resistance of the opposing arms of the bridge circuit. The unitary ratio of the several arms of the bridge results in the most overall sensitivity of control and of the largest signal voltage from the bridge circuit for the operating ranges involved.

The power for the entire control system is derived from the usual 24—28 volt battery or generator 35. In order to provide the necessary reference alternating control voltage for the system, a self-contained oscillating unit 95 is provided, including a double triode electronic tube 96 and a multiple winding transformer 97. Transformer 97 includes main primary windings 98, 100 and 101, and secondary windings 102 and 103. The positive terminal of D. C. source 35 is connected to a conductor 104 which is in turn connected to the mid-point of primary winding 98. The terminals of primary winding 98 are connected to the anodes 105, 106 of tube 96, and a condenser 107 is connected across winding 98. The dual cathode 108 of tube 96 is grounded at 110 and thus is in effective electrical circuit connection with the negative terminal of source 35 which is grounded at 111. Grids 112 and 113 of tube 96 are each connected to one terminal of a secondary winding 100, 101, the opposite terminals thereof being grounded. The oscillator circuit thus connects the two sections of tube 96 in a symmetrical push-pull circuit of the reversed feed back type. The resonant or so-called "tank circuit," including condenser 107 in parallel with the center tapped primary winding 98 of transformer 97 has a capacitance value selected to give an oscillator frequency of approximately 1500 cycles per second, for example. The high frequency reference voltage enables a more sensitive operation of the system in controlling the temperature of the aircraft engine or other heating medium.

Conductors 114 and 115 apply the reference alternating voltage from secondary winding 103 to the junction points 116 and 117 of electrical bridge B. The signal voltage from the bridge is applied by a conductor 118 connected to adjustable contact 85 of potentiometer 75, to the control grid 120 of the first stage of a double triode amplifier tube 121. Amplifier tube 121 is a two stage amplifier, resistance-capacitance coupled and using the two sections of the double triode tube in cascade. The circuit of the amplifier is conventionally coupled, with a low plate voltage obtained directly from the 28 volt aircraft battery system through the medium of conductor 122 connected to conductor 104. This voltage is applied to plates 123, 124 through voltage limiting resistances 125, 126. Plate 123 of the first amplifier section is capacitance coupled through condenser 127 to grid 128 of the second amplifier section. The output or anode current of the second section of the amplifier is capacitance coupled through condenser 130 to the center tap of secondary winding 102, and is also connected to ground through resistance 131.

The output signal voltage of tube 121 is thus impressed across resistance 131, where it is combined with an alternating reference voltage impressed in phase opposition on the control grids 132, 133 of a double power tube 135. Grids 132 and 133 are connected, in phase opposition, to opposite terminals of center tapped transformer winding 102. The screen grids 134, 136 of tube 135 are connected, by conductor 137 to conductor 122 which is in turn connected through conductor 104 to the positive terminal of D. C. source 35. The double cathode 138 of tube 135 is grounded at 140. Anodes or plates 141 and 142 of tube 135 are each connected in series circuit relation with one coil winding 143 or 144 of differential relay 145 illustrated more particularly in Fig. 9. The opposite terminals of coils 143, 144 are connected by a conductor 146 to the positive terminal of D. C. source 35. Condensers 147, 148 are connected in parallel with coils 143, 144 to by-pass the alternating current component of the current through the coils and prevent humming or chattering of the relay.

Differential relay 145, which is shown schematically in Fig. 9, is an important feature of the present invention. The relay is a novel polarized differential relay, of high sensitivity. It is incorporated in the system in a manner to insure effective operation over possible wide variation in the operating voltage supplied to the system from the battery-generator. Thus a nominal 28 volt supply may in some instance drop to as low as 18 volts, or rise to 30 volts or higher. In view of the design of the system with nominally 28 volt tubes 96, 121, 135, such voltage variation is very substantial. The polarized relay 145 permits the temperature control system to function over such wide supply voltage variations, maintaining stability at over voltage; and operability, at under voltage. This is important for use on aircraft.

Fig. 9 illustrates the magnetic flux paths of the relay 145, and the disposition of windings 143 and 144 thereon. The letters "N," "S" have been used to indicate the relative polarities of the elements of the relay. As shown in Fig. 9, the relay comprises a base 150 of magnetic material, such as soft iron, at the center portion of which is mounted a permanent magnet 151 having its south pole "S" adjacent base 150 and its north pole "N" adjacent the center of a magnetizable armature 152 pivotally mounted on a bracket 153. Core members 154 and 155 are mounted at either end of base 150, and with no current in the relay coils, the polarizing permanent magnet 151 produces flux in the magnetic circuits such that the armature and the pole pieces are polarized as shown by the symbols N and S. Alternatively, the actual polarities of the pole pieces, permanent magnet and the armature may be opposite to those shown, depending upon the particular polarity of permanent magnet 151.

Coil windings 143 and 144 are each divided into two sections A and A' and C and C', respectively. Winding sections A and C are wound on pole piece 154, in a direction to oppose each other. Similarly, coil sections A' and C' are wound on pole piece 155 in a direction to oppose each other. While sections A, C and sections A', C' have been shown as separate coils on each pole piece, in actual practice they are superimposed in a double wire winding obtained by having the two wires wound together on the winding form in the same manner as if for a non-inductive winding. Coil sections A and A' are equal in ampere-turns with coil sections C and C', respectively, and thus the ampere-turns on each pole piece cancel out when the current through plates 141 and 142 of tube 135 are equal. Under such conditions the magnetic flux paths are as indicated by the broken lines and arrows in Fig. 9.

In a typical example, coil sections A and A' tend to produce magnetic flux on a clockwise direction around the magnetic structure whereas coil sections C and C' tend to produce magnetic flux in the counterclockwise direction around the magnetic structure. Armature 152 carries the relay contacts and, in practical construction, the springs supporting these contacts assist in balancing the armature. Since under null conditions the plate currents of tube 135 are equal in the polarized relay circuit, they do not affect the magnetic flux conditions irrespective of the actual value of the anode plate currents, within reasonable limits. This is because the ampere-turns cancel out under these conditions. Thus, the magnetic fluxes at null signal currents are practically independent of the voltage of the aircraft power system.

However, when the plate currents of tube 135 become unbalanced due to a signal from bridge circuit B being impressed on grids 132, 133, the net or resultant ampere-turns will no longer cancel. Hence, the pole flux at one end of armature 152 will be greater than that at the other end, thus giving an unbalanced pull swinging the armature in one direction or the other.

Indicating the current from plate 141 as $I_1$, and the current from plate 142 as $I_2$, and the magnetic flux in the counter clockwise dotted line path as F and that in the clockwise dotted line path F', the following relationships apply. When $I_1$ exceeds $I_2$, the magnetomotive forces of coil sections A and A' exceed those of coil sections C and C'. The resultant ampere-turns increase the magnetic flux F' and decrease the magnetic flux F. If magnetic saturation could be neglected, the increase in flux F' in the right hand air gap would equal the decrease in flux F in the left hand air gap. The new value of flux F' would then be equal to one-half of the flux of permanent magnet 151 plus the increase over the "null" value of flux F', and the new value of flux F will be equal to one-half the flux in permanent magnet 151 minus the decrease from the "null" value of flux F. The resultant pull on the armature may be assumed to be approximately proportional to the difference of the squares of F' and F, or approximately proportional to twice the product of the flux of permanent magnet 151 and the change in flux in the air gaps.

The statement that the resultant pull is proportional to twice the product of the permanent magnet flux and the change in flux indicates that, with a large value of polarizing flux, due to permanent magnet 151, only a small change of the fluxes in the air gaps is required to produce the resultant pull. Therefore, by using a strong polarizing magnet, it is possible to operate the relay with a small value of differential ampere-turns. In computing the required change in flux, many other factors, such as the stiffness of the contact springs and the size of the air gaps, must be considered in order to determine the best strength of the magnet for the desired operating characteristics.

With a differential relay, a comparatively strong "null" or standby current may be permitted to flow through the relay coils when the bridge is balanced, resulting in a null signal to the control circuit. As the same current flows through both coils, the relay is not operated but is maintained in a condition of unstable equilibrium. When a signal voltage, due to unbalancing of bridge circuit B, is impressed on the grids of the electronic tube 135, the current through one section of the tube is increased and that through the other section is decreased. This results in a sensitive operation of the relay. For instance, in a practical case the "null" current through both coils of the differential relay might be six milliamperes. A small control signal on grids 132, 133, causes the current through one coil to be increased by two milliamperes and that through the other coil to be decreased by the same amount. Hence, there is a net of four milliamperes acting to operate the relay.

On the other hand, were two separate relays used, such a relatively strong "null" current could not be permitted to flow through the relays as it would tend to cause one or both of the same to operate even without the imposition of a signal voltage on the grids of the electronic tubes. Under such condition, if the signal voltage from bridge B were sufficient to increase the current through the selectively activated relay coil by two milliamperes, the decrease of the current through the unactivated coil would have no effect in increasing the net current and thus force available to operate the relay armature of the selectively activated relay. Accordingly, a differential relay of the type shown in Fig. 9 is much more sensitive in response than would be two independent relays and has an effective snap action.

The use of a differential relay as the controlling element has a further advantage over two separate relays in that the single pivoted armature 152, common to both relay coils 143 and 144, prevents accidental energizing of motor 54 for reverse directions of rotation at one time, as might occur were two separate relay arms used. The sensitivity is increased due to the positive action of the relay coils in swinging the armature in opposite directions. This feature also enhances the stability of control.

In order to maintain maximum sensitivity of relay 145, only relatively small currents are controlled by the relay armature. Hence, a pair of secondary relays 156 and 157 are provided which are selectively energized by relay 145 to energize motor 54. For convenience of illustration, relay 145 has been shown in Fig. 8 as comprising two armatures 152 and 158. These armatures are operable as a unit, and, in a practical construction, would be a single, compound armature. The pivot points of armatures 152 and 158 are interconnected by a conductor 160. Contacts 161 and 162 associated with armature 152 are connected by a conductor 163 to the central or "automatic" tap 164 of manual override switch 41. The movable contact arm of switch 41 is connected by a conductor 165 to conductor 104 and thus to the positive terminal of D. C. source 35.

Relays 156 and 157 each have one terminal connected to a contact 166 or 167 associated with armature 158. The other terminals of relays 156, 157 are interconnected and grounded at 159. Hence, upon conjoint swinging movement of armatures 152 and 158 in either direction, one or the other of relays 156 or 157 will be energized by connection, through switch 41, to the positive terminal of source 35, provided switch 41 is in the central or "automatic" position. Relay 156 is provided with a pair of armatures 170 and 171 jointly controlling the energization of motor 54 for rotation in one direction. Similarly, relay 157 is provided with a pair of armatures 172 and 173 controlling the rotation of motor 54 in the opposite direction.

To place the system thus far described in operation, manual override switch 41 is moved to the central position shown in Figs. 1 and 8 where it engages "automatic" contact 164. This connects the positive terminal of source 35 to the relay system including differential relay 145 and secondary relays 156, 157. An alternating current reference potential across the bridge circuit B is derived, as previously described, from secondary winding 103 of oscillator transformer 97. Selector switch 40 is moved to connect a selected one of fixed resistances 86 or 87 in the bridge circuit depending upon the particular temperature range at which it is desired that engine 55 operate. Resistances 86 and 87, and their series connected calibrating resistances 88 and 89, are designed to be fixed in ohmic value, preferably being wound of wire such as "Advance" metal having a zero or negligible temperature coefficient to insure their being reference resistances in the bridge despite ambient temperature changes therein. In the present system, resistances 86 and 87 may correspond effectively to the effective resistance of parallel elements 30 at say 350° F. and 475° F. However, such values are exemplary only, and other or further ranges may be used, requiring only suitable choice in the ohmic value of the resistances. Adjustable resistors or potentiometers 88, 89 are for the purpose of calibrating the total value of the resistance arms 86 and 87 during assembly or installation.

When the temperature of the engine changes from a point affecting the balance of bridge circuit B, the direct variation in temperature of elements 30 causes a change in their resistance. Such resistance change, in turn, unbalances bridge circuit B and an alternating current signal potential is impressed on grid 120 of tube 121. The amplified signal potential from plate 123 is impressed on grid 128 of tube 121. The amplified output from anode 124 is impressed across resistance 131 through coupling condenser 130. The two control grids 132 and 133 of tube 135 are excited in phase opposition by alternating voltage from the center tapped winding 102. The grids are alternately driven positive at the peaks of the cycles of this excitation voltage, but the grid current is limited to a few microamperes by the high resistance of resistor 131 connected between the mid tap of winding 102 and ground. Assuming balanced characteristics for both halves of tube 135 at null, or when the temperature of thermosensitive elements 30 is normal, the two plate currents of tube 135 due to this alternating current excitation have the same average direct current value. Hence, the currents in the coils 143 and 144 of differential relay 145 are equal and their magnetic effects mutually cancelled, as described above in connection with Fig. 9.

The amplified signal voltage from bridge B, resulting from a departure of the temperature from its normal value, is thus impressed across resistor 131. The signal voltage is in-phase with the excitation voltage applied to one grid 132 or 133 and 180° out-of-phase with that applied to the other grid. Consequently, the alternating voltage between common cathode 138 and one grid 132 or 133 is increased, while that between the cathode and the other grid is decreased. If tube 135 were operating on the linear portion of its plate current vs. grid current characteristic, this unbalance of the alternating grid voltages would affect only the alternating grid components of the plate currents, and would not change the average or direct current values of the plate current. However, the parameters of the tube 135 are so adjusted that the tube is operating on the curved part of such characteristic. The resultant non-linear relation between the plate current and grid voltage causes the average or direct plate current to increase on the side of the tube having the higher alternating grid voltage, and the direct plate current to decrease on the side having lower alternating grid voltage.

The resulting differential current operating through coils 143 and 144 of relay 145 effects a swinging movement of armatures 152 and 158 in one direction or the other. Consequently, one relay 156 or 157 is selectively energized to effect rotation of motor 54 in one direction or the other. The direction of rotation effected by the particular secondary relay energized, is so chosen as to vary the position of flaps 18 in a direction to restore temperature equilibrium at engine 55. When such temperature equilibrium is restored, bridge B is rebalanced through movement of contact 85 along potentiometer 75, and the signal voltage from the bridge decreases to zero effecting opening of all the relay contacts and consequent stopping of motor 54.

Motor 54 is energized from direct current source 35 in the following manner. One terminal of the motor armature is grounded at 175, thus placing it in effective circuit connection with the grounded negative terminal 111 of source 35. The other terminal of the motor is connected, in series with the energizing coil of clutch 56, with the junction point 176 of field windings 177 and 178. Clutch 56 is also provided with a shunt energizing winding which is connected by a conductor 180 to ground 175. Field windings 177 and 178 are reversely wound for effecting rotation of armature 181 in opposite directions.

The outer terminal of field winding 177 is connected by conductor 182 through final limit switch 70 (Fig. 6) and conductor 184 to a front contact 185 of secondary relay 156. The outer terminal of field winding 178 is connected through conductor 186, final limit switch 71, conductor 188, switch arm 190 of stroke limiting switch 36, conductor 191 and conductor 192 to a front contact 193 of secondary relay 157.

A conductor 194 connects a back contact 195 of relay 156, in parallel with back contact 196 of relay 157, to "automatic" contact 164 of switch 41 which, when the system is set for automatic operation, is connected to the positive terminal of source 35 through conductor 165. Front contact 197 of relay 156 is connected to back contact 198 of relay 157. Similarly, front contact 200 of relay 157 is connected to back contact 201 of relay 156. Armatures 170 and 171 of relay 156 are mechanically interconnected as are also armatures 172 and 173 of relay 157.

Assume that the engine temperature decreases. The resulting signal voltage impressed on grids 132, 133 of tube 135 will be such as to effect energization of relay 145 in a direction to energize relay 156. Relay 156 will engage its armature 170, 171 with front contacts 185 and 197, respectively. Motor 54 will then be energized over the following circuit, assuming that switch 41 is in the "automatic" position: the positive terminal of source 35, conductor 104, conductor 165, switch 41, contact 164, conductor 194, back contact 196, armatures 172 and 173, contacts 198 and 197, armatures 171 and 170, front contact 185, conductor 184, "closing" final limit switch 70, conductor 182, field winding 177, clutch 56 and armature 181 to ground at 175. The motor will then rotate in a direction to effect closing of flaps 18 and consequent raising of the ambient temperature of engine 55. Such closing movement will continue only until such time as temperature equilibrium is reestablished adjacent engine 55. At such time, the signal voltage will be reduced to its null value and relays 145 and 156 will open. This breaks the previously described energizing circuit for motor 54.

Upon a rise in the ambient temperature of motor 55, energization of relay 157 will be effected, causing this relay to engage armatures 172, 173 with front contacts 193 and 200, respectively. In this instance, motor 54 is energized over the following circuit, which is the same as that previously described as far as conductor 194: back contact 195, armatures 170, 171, contacts 201 and 200, armatures 173 and 172, contact 193, conductors 192 and 191, switch arm 190, conductor 188, "opening" final limit switch 71, conductor 186, field winding 178, clutch 56, armature 181 and thence to ground at 175, as previously described. Motor 54 thereupon operates in a direction to open flaps 18 until such time as temperature equilibrium of motor 55 has again been reestablished, whereupon relays 145 and 157 open, deenergizing motor 54.

As stated previously, manual override switch 41 is provided for opening or closing the flaps independently of the automatic control system. This switch is provided with the switch arm 41 and with three contacts 164, 203 and 204. Contact 164 connects the system for automatic operation under the control of bridge B. When switch arm 41 engages contact 203, the motor is energized to open the flaps independently of the automatic control system. Similarly, when switch 41 engages contact 204, the motor is energized to close the flaps independently of the automatic control system. Contact 203 energizes motor 54 to open the flaps over the same circuit as previously described for automatic control of the opening movement of the flaps. For this purpose, a conductor 205 connects contact 203 to conductor 192 of the automatic control circuit. Similarly, contact 204 is connected by a conductor 206 to conductor 184 forming part of the automatic control circuit for the closing movement of the flaps.

As explained in the beginning of the specification, in certain instances it is desired that the opening movement of the flaps be limited to a predetermined range less than the full range of movement upon the occurrence of a given condition. The present circuit is particularly designed for use in a system wherein a retractable landing gear in its extended or downward position may be utilized to transfer the modulating control of the flaps from one range of operation to another. Accordingly, the circuit incorporates an automatic switch device 36 operable by landing gear 37 to automatically limit the opening movement of the flaps when the landing gear moves to the extended or down posiestion.

Switch 36, for example, may comprise a pair of contact arms 190 and 207 which are connected together, for joint operation by a plunger 208 having a roller 209 engaged with a cam 210 operated by retractable landing gear 37. Normally, switch 36 is in a position where its contact arms 190 and 207 engage a pair of contacts 211 and 213, respectively. Contact 211 is included in the flap opening circuit comprising "open" limit switch 71. Contact 213 is an electrically dead contact. Upon movement of landing gear 37 from the retracted position shown in full lines in Fig. 8 to the extended position shown in dotted lines, roller 209 rides up onto the higher portion 214 of cam 210 effecting a movement of contact arms 190 and 207 into engagement with a pair of contacts 215 and 216, respectively. Contact 215 is an electrically dead contact whereas contact 216 is connected in circuit with micro switch 78 operable by cam 76, as shown in Figs. 6 and 7 of the drawings.

Under such circumstances, the operation is as follows. Cam 76 is in its neutral position, as shown in Figs. 7 and 8, when the flaps are at the extreme end of the limited range of opening movement. In such position, both switches 77 and 78 are in the open position. The arrangement is such that, if the flaps move beyond the end of the limited range into the full range, cam 76 will move counter clockwise from the position shown in Figs. 7 and 8, and the roller associated with switch 78 will then engage discontinuous surface portion 82 of cam 76 permitting switch 78 to close. The closing of switch 78 completes a circuit from the positive terminal of source 35 through conductor 104, switch arm 207, contact 216, conductor 217, switch 78, conductor 182 and field winding 177 to energize motor 54 in a direction to effect closing movement of the flaps. When the flaps have been retracted from their position beyond the end of the limited range to within such intermediate range, cam 76 has moved clockwise to its neutral position opening switch 78 and effecting an abrupt stoppage of motor 54 through clutch-brake unit 56.

At any point within such limited range of opening movement, cam 76 is moved clockwise from its neutral position effecting closing of switch 77. As switch 77 is connected in parallel with final limit switch 71, and as switch 71 is disconnected from the circuit when landing gear 37 is in the extended position due to movement of switch arm 190 out of engagement with contact 211, switch 77 controls the limit of movement of the flaps within such limited range. In other words, when landing gear 37 is in the extended position, the "opening" circuit of motor 54 is broken at switch 77 whenever cam 76 reaches its neutral position. The cam reaches its neutral position at the upper limit of the intermediate range.

In practical operation, motor 54 functions in incremental or modulating steps to maintain fine control of the rate of cooling fluid flow. The motor operates in either direction, depending upon the direction in which the temperature change of the heated body takes place. The sensitivity of the control is dependent upon the sensitivity of the elements 30, the resistance of which varies in accordance with temperature changes therein in either direction. As explained above, in the invention system very sensitive elements 30 are provided which have a substantially uniform change in resistance per unit change in temperature over a relatively wide range. During operation of the system, the system may be practically designed so that motor 54 is energized in either direction to correct the flow of cooling fluid in accordance with changes in the temperature of the engine or heated body of as low as ⅕° F.

The modulating range of the temperature control system of the invention corresponds to the relative value of the resistance of potentiometer 75. The potentiometer resistance is made to correspond to the change in resistance of units 30 throughout the desired temperature range for the system. Thus, when the bridge is unbalanced due to a change in the resistance of elements 30 caused by a change in temperature, a new balance is reeffected by adjustment of the potentiometer contact 85 along the potentiometer. Such adjustment is effected in coordination with the movement of flaps 18 to a point where temperature equilibrium is established. A new balance is effected at any position along potentiometer 75, either up or down from the substantially central position illustrated in Fig. 8. For instance, when the resistance 86 is switched into the circuit by switch 40 corresponding to that of elements 30 at 350° F., the flaps will be at their closed position with contact 85 at the upper end of potentiometer 75 at such 350° F. temperature. At any temperature between 350° F. and 375° F. assuming a 25° F. modulating temperature range, the flaps will be in an intermediate position and contact 85 will likewise be in an intermediate position along potentiometer 75. At a temperature of 375° F., the flaps will be at their wide open position with contact 85 at the lower end of potentiometer 75.

Tapered potentiometer 75 is provided because the increase in the flow of cooling fluid for each increment of the flap opening is not the same for all positions of the flaps. For instance, if the flaps are fully closed, a given increment of opening movement will effect a relatively large increase in the flow of cooling fluid over the engine. However, if the flaps are nearly open, the same given increment of opening movement of the flaps will effect only a small increase in the amount of cooling fluid flowing over the engine. Accordingly, the tapered potentiometer or rheostat is provided so that there is a smaller change in the relative resistance of the sections of potentiometer 75 for a given increment of flap opening as the flaps approach a fully open position. This condition may be understood by reference to Fig. 10 which illustrates the relation between the percent of flap opening and the value of the follow-up resistance in ohms.

For practical purposes, the tapered resistance is made in a plurality of sections each of which is of greater resistance per unit length than is the preceding section. A three section potentiometer is diagrammatically illustrated in Fig. 10. It will be noted that starting from a fully closed position equalling zero percentage of flap opening, there is a relatively rapid change in the value of the follow-up resistance for the given percentage of flap opening. In the second range, the change in the value of the follow-up resistance becomes less for a given percentage of flap opening. In the third section, which is in the neighborhood of full opening movement of the flaps, the change in the value of the follow-up resistance is relatively minor compared to the percentage of flap opening. By providing a section resistance of the type described, the system is made adaptable to vary the amount of cooling fluid in correct proportion over the entire range of follow-up resistance, compensating for the uneven cooling increments over the angular range of flap opening.

An important feature of the present invention contributing greatly to stability and inhibition of hunting is the use of a low inertia abruptly acting electromagnetic clutch and brake unit 56. A preferred clutch and brake unit is shown in longitudinal cross-section in Fig. 11. Clutch and brake unit 56 includes driving member 225 of magnetic material having hub portion 226 keyed to the shaft 227 of armature 181 of motor 54. Armature shaft 227 is provided with a reduced extension 228. Mounted on extension 228 is a driven clutch member 230 likewise of magnetic material and having a hub portion 231 concentric with extension 228 and supported thereon through a ball bearing 232. Hub portion 231 is provided with a reduced extension 233 which is mounted in ball bearing 234 in a member 235 disposed in housing 236. Drive pinion 62 is mounted in the outer end of extension 233. Housing 236 is of magnetic material and surrounds hub portion 231 of driven member 230, the housing being completed by an extension 237 of member 235.

Mounted in the compartment thus formed is a magnetizing winding 238 which is preferably connected in electric circuit relation with motor 54. In the present invention, winding 238 is in two parts, one connected in series with motor armature 181 and the other connected in shunt therewith through conductor 180 (Fig. 8). A brake surface 240, of suitable material such as cork is mounted in member 235 adjacent driven clutch member 230. A spring 241 surrounding armature shaft extension 228 abuts driving member 225 and ball bearing 232 to normally urge driven member 230 into engagement with brake surface 240. As described in my above referred to Patent No. 2,267,114, driving member 225 may be provided with one or more annular inserts 242 of non-magnetic material to increase the number of magnetic flux interlinkages between the driving and driven members of the clutch. Upon energization of windings 238, driven member 230 is magnetically attracted into frictional and magnetic attraction with driving member 225 to mechanically connect armature shaft 227 to pinion 62.

The magnetic attraction between the driving and driven members overcomes the force of spring 241. Upon deenergization of windings 238, which preferably occurs simultaneously with deenergization of motor 54, spring 241 snaps driven disk 230 into instantaneous engagement with braking surface 240. This instantly disconnects motor 54 from pinion 62 and effects immediate stopping of the driven system connected to pinion 62. Armature 181 may rotate at a decreasing rate due to the stored kinetic energy without moving pinion 62. Accordingly, any tendency for the driven system connected to pinion 62 to hunt on either side of the null position, is effectively inhibited due to the instantaneous braking action of clutch-brake unit 56 when motor 54 is deenergized in response to the control signal reaching zero when the bridge becomes balanced. The clutch and brake unit is particularly effective in small or "inching" movements of the system. This renders a very sensitive temperature control with the invention system.

For the purpose of illustrating the principles of the invention, the temperature control system has been described specifically as applied to maintaining a modulating control of the temperature of an air cooled aircraft engine. However, such specific description is exemplary only, and it will be understood by those skilled in the art that the principles of the invention are applicable equally to liquid cooled engines and also to other and more general temperature control applications. Typical other temperature control applications aboard an aircraft are the control of oil inter-cooler temperature, cabin air temperature, and so forth. In such applications, the temperature bulbs or resistors 30 are placed in the medium or body the temperature of which is to be measured or controlled; and the motor 54 is connected to control the rate of cooling (or heating) means for such medium or body.

The invention is not only applicable to a cooling system, but also to a heating system. For instance, the principles of the invention may be applied to maintaining the temperature of various operating fluids of an aircraft at a preselected temperature by controlling the heating to such fluids, for example, to maintain the engine oil at a predetermined elevated temperature to prevent congealing thereof during high altitude operation of the aircraft, and other uses which will readily occur to those skilled in the art.

Furthermore, the invention likewise is not limited to aircraft applications, but may be generally applied wherever a heating or cooling control problem is present. Thus, the principles of the invention may be applied to space heating or space cooling, such as air conditioning applications. Likewise, the illustrated temperature control system is applicable to refrigeration applications, and to industrial heating or cooling, or temperature controlling or recording in general.

The provision of the self-contained oscillator unit 95 together with the pair of rugged electronic tubes 121 and 135, in combination with the rugged yet sensitive polarized differential relay 145, and secondary relays 156, 157, results in a very rugged control system particularly adaptable for use aboard aircraft and able to withstand rough usage encountered in aircraft operation. Oscillator unit 95 eliminates the necessity for providing a separate source of alternating current aboard the aircraft, thus decreasing the weight of components necessary to be carried abroad the aircraft. The elements of the control system are relatively simple, while still affording a very sensitive control of the temperature of the heated body or engine. Furthermore, the relays permit the use of this system with any type of current supply for motor 54. The control system is thus not limited with respect to the type of power available for operation of control motor 54. This greatly increases the adaptability of the system to numerous installations.

The incorporation of the tapered potentiometer 75 and limit switches 70, 71, 77 and 78 in electromechanical control unit 26, together with the incorporation of electronic tubes 121, 135 and relays 145, 156, 157 together with elements of the bridge circuit B in electronic control unit 28 or 29, enables rapid and efficient installation and servicing of the system. In particular, the several components of the system may be mounted at any desired part of the aircraft, being electrically interconnected by suitable multi-conductor control cables with the panel 33 adjacent the pilot or flight engineer's compartment containing the switches for effecting either automatic or manual control and selecting the desired temperature range for engines 55.

While a specific embodiment of the invention has been shown and described to illustrate the principles thereof, it will be apparent to those skilled in the art that modifications of the invention may be practiced without departing from such principles as defined in the following claim.

What is claimed is:

An automatic temperature control system for maintaining temperature equilibrium of a body within a predetermined range comprising mechanism operative to establish temperature equilibrium of the body; an electric motor for controlling said mechanism; first limit switch means operatively connected with said motor and operable when the temperature of the body attains a value outside such predetermined range to render said electric motor ineffective on said mechanism at either limit of operation thereof until the temperature of the body reattains a value within such predetermined range; switch mechanism including second limit switch means also operatively connected with said motor and effective, when operated, to change the range of operation of said first named mechanism; and means automatically operable upon occurrence of a given condition to operate said switch mechanism.

WILLIAM P. LEAR.

REFERENCES CITED

The following references are of record in the file of this patent:

UNITED STATES PATENTS

| Number | Name | Date |
|---|---|---|
| 1,356,763 | Hartley | Oct. 26, 1920 |
| 1,624,537 | Colpitts | Apr. 12, 1927 |
| 2,025,542 | Lugar | Dec. 24, 1935 |
| 2,081,762 | Nissen | May 25, 1937 |
| 2,168,599 | Beisel et al. | Aug. 8, 1939 |
| 2,275,317 | Ryder | Mar. 3, 1942 |
| 2,279,615 | Bugatti | Apr. 14, 1942 |
| 2,314,937 | Hannon | Mar. 30, 1943 |
| 2,334,216 | Newton | Nov. 16, 1943 |
| 2,348,212 | Gill | May 9, 1944 |
| 2,368,501 | Thompson | Jan. 30, 1945 |
| 2,384,088 | Hagen | Sept. 4, 1945 |
| 2,390,425 | Crum | Dec. 4, 1945 |
| 2,403,917 | Gille | July 16, 1946 |

FOREIGN PATENTS

| Number | Country | Date |
|---|---|---|
| 491,933 | Great Britain | Sept. 12, 1938 |

OTHER REFERENCES

"Ganots' Physics," pp. 896 and 897, eleventh edition, pub. 1883 by William Wood & Co., New York, N. Y.